United States Patent [19]

Serio

[11] Patent Number: 4,864,770
[45] Date of Patent: Sep. 12, 1989

[54] COLLAPSIBLE CRUSTACEAN TRAP

[76] Inventor: Salvatore D. Serio, 42 Ten Hills Rd., Somerville, Mass. 02145

[21] Appl. No.: 817,409

[22] Filed: Jan. 9, 1986

[51] Int. Cl.$^4$ ............................................. A01K 69/10
[52] U.S. Cl. ........................................ 43/105; 43/100
[58] Field of Search ..................... 43/100, 102, 105; 220/6, 7; 24/300, 301, 298, 176, 186

[56] References Cited

U.S. PATENT DOCUMENTS

| | | | |
|---|---|---|---|
| 1,001,051 | 8/1911 | Kohout | 220/6 |
| 1,474,087 | 11/1923 | Prime | 43/100 |
| 2,516,658 | 7/1950 | Stelly | 43/100 |
| 2,821,047 | 1/1958 | Ruiz | 43/102 |
| 2,892,562 | 6/1959 | Smithson | 220/7 |
| 4,030,232 | 6/1977 | Niva | 43/105 |
| 4,416,082 | 11/1983 | Strobel | 43/105 |
| 4,554,760 | 11/1985 | Ponzo | 43/100 |

Primary Examiner—Kurt Rowan
Attorney, Agent, or Firm—Joseph H. Killion

[57] ABSTRACT

An improved Collapsible Crustacean Trap is described which includes substantially rectangular top and bottom panels which are hinged to side panels. Each of the side panels is hinged in the middle so that it can move between a substantially vertical and a substantially horizontal position. Releasable connectors are provided for securing the panels in a rectangular box. A cover is provided, and an entrance for the crustacean is also provided.

6 Claims, 1 Drawing Sheet

COLLAPSIBLE CRUSTACEAN TRAP

BACKGROUND OF INVENTION

Our invention relates to a collapsible trap for crustaceans.

Collapsible crustacean traps are known in the prior art.

For example, crab traps involving a frame and a netted structure are common in the prior art and are commonly called crab traps or crab pots. These crab traps are generally utilized in shallow coastal waters where the frame and netted structure may be combined on the deck relatively easily and lowered to the ocean floor. With a minimum of traps a commercial crabber can catch a large number of crabs, whereas a commercial lobster trapper requires many traps to catch just a few lobsters (one pound per trap fished is considered a good day's catch).

Lobster trapping, particularly commercial lobster trapping is a different story since the traps are larger, generally utilized a greater distance from shore and at greater depths, all year round. The typical commercial lobster trap is a sturdy substantially rectangular box made of wood or plastic covered wire mesh, strong and rugged enough to withstand the lobsters, the handling, and the conditions above and below the sea.

U.S. Pat. No. 3,373,523 (Olafsen) teaches a collapsible crab trap. Once the trap is collapsed and the two ends are disconnected, they are free to move freely, in larger lobster pots, a difficult condition to deal with in rough seas or in storing the pots.

U.S. Pat. No. 3,395,073 (Olsen) discloses a collapsible crab trap which collapses (after the tunnel opening units are removed and separately stored). This crab pot similarly, upon collapse, has free swinging ends making the device (particularly in a large lobster trap) more complicated to store and use.

U.S. Pat. No. 4,075,779 (Olafsen) teaches a crab trap which has separate tunnel opening units, thereby complicating storage and stacking.

What is needed is a lobster trap which is collapsible to a minimum size so that the lobsterman does not have to make repeat trips to the fishing area, which does not have loose, floppy parts which make it difficult to handle and store, and which is as rugged and durable as the present commercial lobster trap.

SUMMARY OF INVENTION

My invention relates to an improved crustacean trap, particularly a collapsible crustacean trap, and more particularly an improved collapsible lobster trap.

I have discovered an improved collapsible crustacean trap comprising substantially rectangular top and bottom panels arranged vertically with respect to each other. The top panel having an opening therein. Four side panels are hingedly connected at the upper end to the top panel and at the lower end to the bottom panel. Each of the side panels is hinged in the meddle so that it moves between a first substantially vertical position and a second substantially horizontal position which allows the improved crustacean trap to be collapsed. Releasable connectors are provided for securing the top and bottom panels and side panels in a rectangular box. A cover is hinged to the top. There is an entrance to the box.

My invention provides numerous advantages over those devices found in the prior art. One advantage of my invention is that it is quite similar in appearance to the present trap and speedily assembled requiring little skill, agility or training to adjust into condition for use. Another advantage of my invention is that by being collapsible more traps can be carried on the deck of the boat (approximately 4 to 1) and require fewer trips to bring and remove the traps from the fishing grounds. (saving on fuel and labor costs).

Other advantages of my invention will become apparent when viewed in light of the accompanying drawings and following detailed description.

DETAILED DESCRIPTION OF THE DRAWINGS

Figure 1:
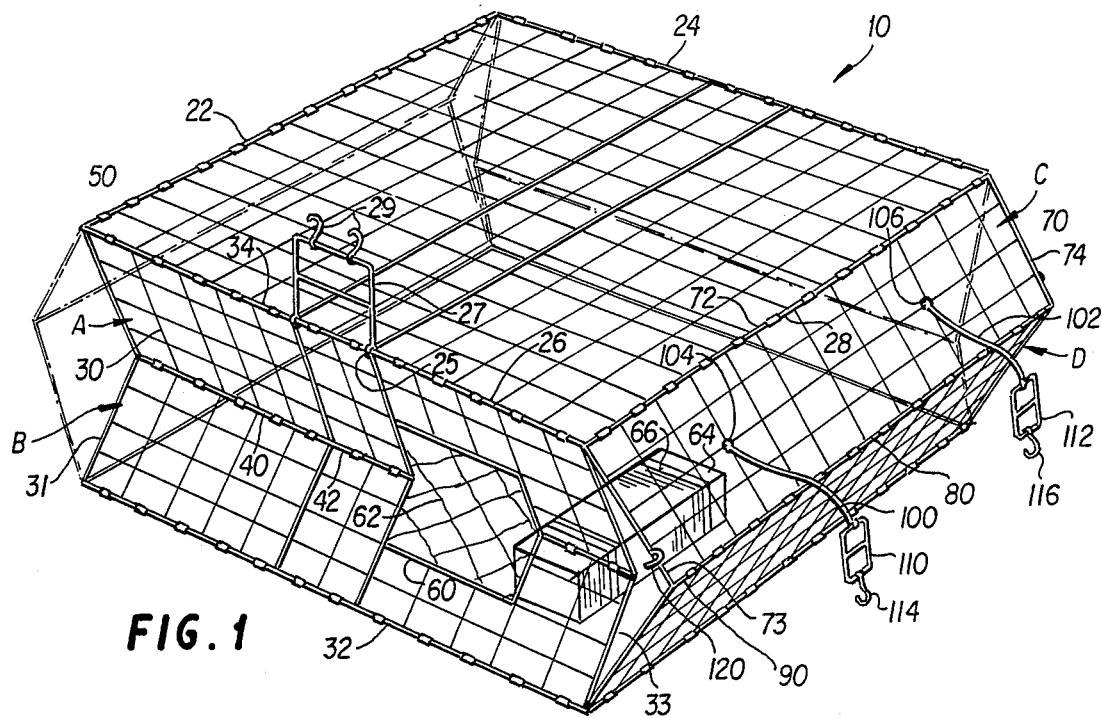
FIG. 1 is an isometric, plane view of the improved crustacean trap in the collapsed position.

Referring now in particular to the accompanying drawings, the preferred form of my Improved Collapsible Crustacean Trap is generally indicated at 10 in FIG. 1.

Figure 2:
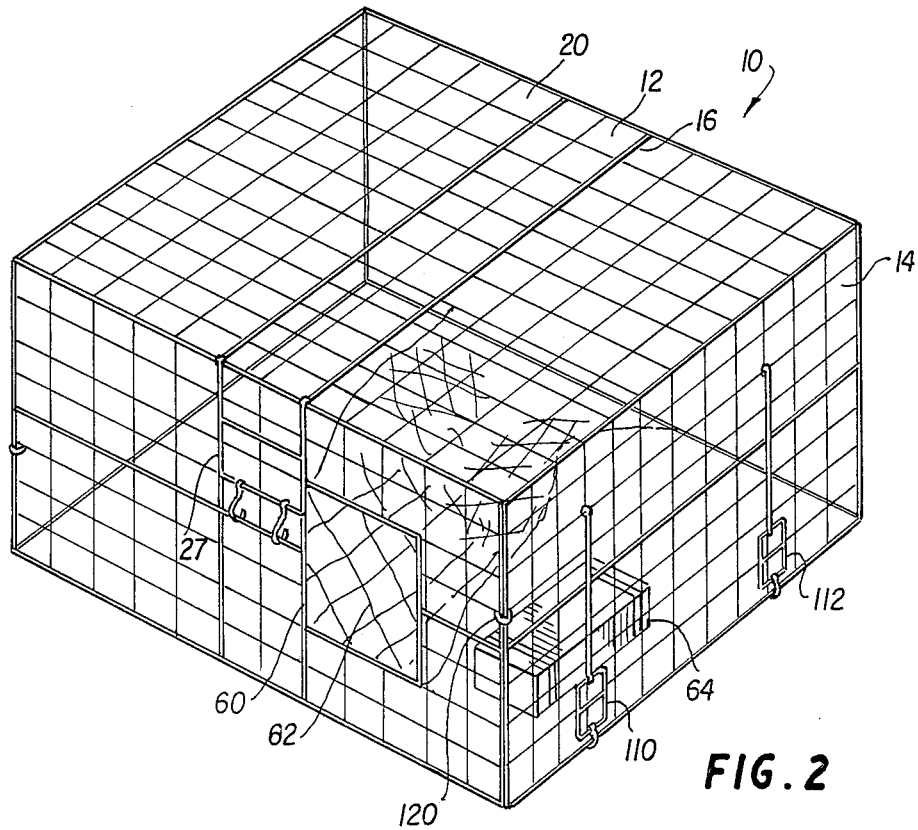
FIG. 2 is an isometric plane view of the improved crustacean trap in the expanded position.

Top panel 20, (FIG. 2) includes openings 12, the so-called "parlor" from which the lobster is removed after being trapped and 14, the so-called "entrance". Center bridging 16, (FIG. 2), and in fact, all the panels are made of plastic coated wire mesh and includes edge bars 22, 24, 26, 28.

Cover 23, which is a substantially rectangular piece of plastic coated wire mesh, is secured to top panel 20, on one side by strap hinges 50 by locking or unlocking. Handle 27, which is a grid-like piece of the wire mesh with hooks 29, welded to one end and at the other end strips 25, are secured to elastomer tension straps 23.

When the improved crustacean trap is in use, the improved crustacean trap is baited and the cover 23, is closed over openings 12, 14, in the top panel. The handle is pulled so the elastomer tension straps are taut and the hooks are hooked to the grid wire mesh of the side panel, thereby securely closing the improved crustacean trap.

Front side panel 30 includes edge bars 31, 32, 33 and 34.

Top panel 20 is connected to front side panel 30 by a plurality of strap hinges 50, which encompass and join edge 26 of the top panel with edge 34 of the front side panel. Strap hinges are used throughout to hold the edges together.

Front side panel 30 is divided into two parts, A and B, where the top edge 34 of the top half A is the top edge of the front side panel and the bottom edge of the top part A is indicated in FIG. 1 at 40.

Similarly the bottom edge of the bottom section B is the bottom edge 32 of the front side panel and the top edge of this bottom section is designated 42.

Edges 40, 42, are hingedly connected utilizing strip hinges so tht the front side panel collapses inwardly when the improved crustacean trap is depressed. A tunnel opening 60, is located on the front side panel and lobster netting 62 (FIG. 2) is adjusted over the tunnel opening 60, so that the lobster enters the tunnel opening and is prevented by the lobster netting 62, from escaping back through the tunnel opening.

Ballast 64 secured by ballast securing straps 66, 68 (not shown).

Back side panel (not shown) is identical to front side panel.

End panel 70 is divided into two parts, top part C and bottom part D, and includes edges 72, 73, 74, 75. (not shown) The top edge 72 of the end panel 70 is the top edge of the top part C, and the bottom edge 74 of the end panel 70 is the bottom edge of the bottom part C. The bottom edge of top part C, designated 80, and the top edge of bottom part D, designated 90, are hingedly connected with strap hinges to extend outwardly when the improved crustacean trap is collapsed.

At each corner of the end panel, elastomeric tension straps 100, 102, are held on one end by securing pins 104, 106 and are connected to grids 110, 112 at the opposite ends having hooked ends 114, 116.

A pair of U-shaped retainers 120, 122, (not shown) are fastened to the vertical sides 73 and 75 on the same part of the end panel as the securing pins for the tension straps are located.

The other end panel 120 is identical with end panel 70.

In use the collapsible crustacean trap is collapsed while in storage. It is taken from a pile, the top is pulled up, the sides either pulled in or out to form a substantially rectangular structure with U-shaped retainers on fthe end panels fitting over the vertical ends of the front side panel and rear panel. The elastomeric tension straps are then extended until the desired tension is reached and the hooks are secured around the edge of both the side panel and the end panel. The collapsible crustacean trap is ready then to be baited and lowered to the ocean floor.

I claim:

1. An improved collapsible crustacean trap which comprises:
   (a) a substantially rectangular bottom panel;
   (b) a substantially rectangular top panel arranged vertically with respect to said bottom panel, defining an opening therein;
   (c) a plurality of side panels hingedly connected at the lower end to said substantially rectangular bottom panel and hingedly connected at an upper end to said substantially rectangular top panel, each of which is hinged in the middle thereof and moveable between a first substantially vertical position and a second substantially horizontal position whereby said collapsible crustacean trap is collapsed;
   (d) releasable securing means for securing said top, bottom and side panels in a collapsible rectangular box including a plurality of substantially rectangular securing means extending at one end thereof to form a hook means and a plurality of first extensible members connected on one end to said side panels and on the other end to a substantially rectangular securing means, and moveable between a first contracted position and a second extended position whereby said releasable securing means is secured to hold said improved collapsible crustacean trap in the substantially vertical position;
   (e) entrance means to said collapsible box;
   (f) cover means connected to said substantially rectangular top panel.

2. The improved collapsible crustacean trap of claim 1 further comprising:
   (a) a plurality of U-shaped retainers affixed to said side adapted so that when said Improved Collapsible Crustacean Trap is assembled said U-shaped retainers fit around the vertical ends of an adjacent side panel.

3. The improved collapsible crustacean trap is claim 1 wherein said cover means further comprises:
   (a) a substantially rectangular member hingedly connected at one end to said subtantially rectangular top panel and said substantially rectangular member is moveable between a first open position and a second closed position;
   (b) releasable securing means adapted to said substantially rectangular member.

4. The improved collapsible crustacean trap of claim 3 wherein said releasable securing means further comprises:
   (a) a first extendible member secured on one end to said substantially rectangular member and moveable between a first unexpanded position and a second expanded position;
   (b) a grid member secured on one end to said first extensible member and at the other end thereof extending to form a hook means.

5. The improved collapsible crustacean trap of claim 1 wherein all panels comprise a polymer coated wire grid.

6. An improved collapsible crustacean trap of the polymer coated wire type which comprises:
   (a) a substantially rectangular bottom panel;
   (b) a substantially rectangular top panel arranged vertically with respect to said bottom panel, defining an opening therein;
   (c) a plurality of side panels hingedly connected at the lower end to said substantially rectangular bottom panel and hingedly connected at an upper end to said substantially rectangular top panel each of which is hinged in the middle thereof and moveable between a first substantially vertical position and a second substantially horizontal position whereby said collapsible crustacean trap is collapsed;
   (d) releasable connector means for securing said top, bottom and side panels in a collapsible box having a plurality of substantially rectangular securing means extending at one end thereof to form a hook means and a plurality of first extensible members connected on one end to said side panels and on the other end to said substantially rectangular securing means, and moveable between a first contracted position and a second extended position whereby said releasable connector means is secured to hold said improved collapsible crustacean trap in the substantially vertical position;
   (e) entrance means to said collapsible box;
   (f) cover means having a substantially rectangular member hingedly connected at one end to said substantially rectangular top panel moveable between a first open position and a second closed position and releasable securing means adapted to said substantially rectangular member.

* * * * *